(12) United States Patent
Hou et al.

(10) Patent No.: US 7,186,367 B2
(45) Date of Patent: Mar. 6, 2007

(54) DOUBLE VACUUM BAG PROCESS FOR RESIN MATRIX COMPOSITE MANUFACTURING

(75) Inventors: Tan-Hung Hou, Poquoson, VA (US); Brian J. Jensen, Williamsburg, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 80 days.

(21) Appl. No.: 11/110,996

(22) Filed: Apr. 19, 2005

(65) Prior Publication Data

US 2005/0253309 A1    Nov. 17, 2005

Related U.S. Application Data

(60) Provisional application No. 60/571,954, filed on May 13, 2004.

(51) Int. Cl.
*B29C 51/10* (2006.01)
*B29C 51/42* (2006.01)

(52) U.S. Cl. .................. 264/571; 264/511; 264/553

(58) Field of Classification Search ................ 264/571
See application file for complete search history.

(56) References Cited

U.S. PATENT DOCUMENTS 4,942,013 A * 7/1990 Palmer et al. .............. 264/511
5,236,646 A * 8/1993 Cochran et al. ............ 264/102

* cited by examiner

*Primary Examiner*—Christina Johnson
*Assistant Examiner*—Monica A Huson
(74) *Attorney, Agent, or Firm*—Barry V. Gibbens

(57) ABSTRACT

A double vacuum bag molding assembly with improved void management and laminate net shape control which provides a double vacuum environment for use in fabricating composites from prepregs containing air and/or volatiles such as reactive resin matrix composites or composites from solvent containing prepregs with non-reactive resins matrices. By using two vacuum environments during the curing process, a vacuum can be drawn during a B-stage of a two-step cycle without placing the composite under significant relative pressure. During the final cure stage, a significant pressure can be applied by releasing the vacuum in one of the two environments. Inner and outer bags are useful for creating the two vacuum environments with a perforated tool intermediate the two. The composite is placed intermediate a tool plate and a caul plate in the first environment with the inner bag and tool plate defining the first environment. The second environment is characterized by the outer bag which is placed over the inner bag and the tool plate.

12 Claims, 4 Drawing Sheets

PRIOR ART

SVB-molded laminate (100X)

DVB-molded laminate (100X)

SVB-molded laminate (20X)

DVB-molded laminate (20X)

DOUBLE VACUUM BAG PROCESS FOR RESIN MATRIX COMPOSITE MANUFACTURING

CLAIM OF BENEFIT OF PROVISIONAL APPLICATION

This application claims the benefit of U.S. Provisional Patent Application No. 60/571,954 filed May 13, 2004.

ORIGIN OF THE INVENTION

This invention described herein was made by employees of the United States Government and may be manufactured and used by or for the Government of the United States of America for governmental purposes without the payment of any royalties thereon or therefor.

BACKGROUND OF THE INVENTION

Polymer matrix composites are comprised of the subgroups of reactive matrix composites and non-reactive matrix composites. Reactive matrix composites typically produce low molecular weight volatiles during curing. Non-reactive matrix composites, also commonly referred to as thermoplastics, are generally high molecular weight structures which are heated to flow and then cooled to cure. When laying up composites prior to curing, adjacent layers may entrap air pockets in between. Additionally, during the curing process, volatiles may be released during the curing process whether as a result of a reaction, from solvent remaining in the prepeg, or otherwise.

Autoclaves have been utilized in fabrication of composite materials. In many circumstances, an autoclave provides enhanced processing flexibility compared to other common processing techniques such as ovens and presses. However, composite fabrication by autoclave is often costly in terms of labor consumption as well as capital investment. Furthermore, autoclave fabrication techniques typically limit the size of the parts which can be produced.

One technique utilized to overcome disadvantages of autoclave fabrication is single-vacuum-bag processing in an oven utilizing vacuum bag pressure. To date, this is believed to be one of the most cost effective out-of-autoclave fabrication techniques for fiber-reinforced resin matrix composites. However, this process and technique is often ineffective when a reactive resin matrix or solvent containing prepreg is present. A reactive resin (e.g., poly(amide acid)/NMP) typically generates reaction by-products (e.g., water) during curing at elevated temperatures. In order to produce a void-free quality laminate, it is often imperative to deplete these volatiles and solvents before commencing forced consolidation. The traditional single-vacuum-bag (SVB) assembly inherently hinders and/or retards the volatiles depletion mechanisms during composite fabrication because a vacuum-generated compaction force is applied to the laminate during volatile depletion. In addition, the one atmospheric pressure associated with the SVB processing tends to create excessive resin flash out of the composite during the B-stage period (i.e., the low temperature ramp-and-hold step as shown in FIG. 1). As a result, resin content and net shape of the consolidated laminate become difficult to control.

Accordingly, an improved out-of-autoclave fabrication technique for use with fiber-reinforced resin matrix composite is believed to be necessary, especially when a reactive resin matrix or solvent containing prepeg is present.

The cure cycle (temperature and pressure profiles) for manufacturing composite laminate with a reactive resin matrix such as poly(amide acid)/NMP resin system or a solvent containing prepreg usually consists of a two-step ramp-and-hold temperature profile as shown in FIG. 1. Temperature and hold duration times in each step are unique for a given composite system. The low temperature ramp-and-hold step is called the B-stage. During the B-stage, prepregs are heated and reaction by-products such as water from the resin's chemical reactions and volatiles from the solvent are generated. However, because of the absence of pressure, volatiles (i.e., solvent and reaction by-products) are free to escape.

Pressure is applied during the high temperature ramp-and-hold step (i.e., the final cure step) to afford laminate consolidation and to attain good physical properties of the resin matrix. The residual volatile level and resin fluidity remaining inside the composite are determined by these temperatures and hold duration steps. Once the consolidation pressure is applied, residual volatiles are locked in and unable to escape. In order to produce a void-fee high quality laminate, the residual processability and the temperature at which forced consolidation is commenced must be achieved through proper design of the cure cycle.

The processability of composites with reactive resin matrices involves a balance between the degree of volatile depletion and the residual fluidity remaining in the polymer. When volatiles are not depleted adequately before the forced consolidation, voids are produced, yielding a laminate with inferior quality. On the other hand, excessive cure advancement in the resin results when excessive B-stage conditions (i.e., severe temperature and prolonged time) are employed, making the composite unprocessable under moderate pressures, due to high resin viscosity. The kinetics of volatile diffusion through the liquid phase is strongly dependent upon resin chemistry, chemoviscosity, temperature and duration at the given temperature. While the reactive resin matrix continues to cure during the B-stage period, the resin fluidity continues to diminish and the composite processability suffers. In order to achieve a void-free laminate, the cure (molding) cycle must enable a sufficient percentage of volatiles to be depleted through the thermal B-stage (in the absence of pressure) before consolidation. In the meantime, an appreciable degree of residual resin fluidity should remain after the B-stage allowing infiltration of resin through fiber bundles in the composite during the pressure consolidation stage initiated at the latter stage of the cycle. Such a balancing act between the degree of residual volatiles and residual fluidity during composite fabrication is very complex and makes the design of cure cycles very challenging.

A schematic drawing to illustrate the concept of a traditional Single-Vacuum-Bag (SVB) in composite manufacturing is shown in FIG. 2. Fiber reinforced reactive resin matrix prepregs are laid up between the caul and tool steel plates. They are then enclosed by a vacuum bag, sealed around the edges onto a tool plate. A vacuum port is built through the tool plate communicating with the environment inside the bag. In the prior art, this assembly is installed in a forced air circulation oven and subjected to a cure cycle for composite curing.

When the bag is purged to atmosphere (i.e., without any vacuum), the bag rests at an equilibrium balanced by the same atmospheric pressure (i.e., 14.7 Psi) from either side of the bag in FIG. 2(a). Under this circumstance, the composite is not subjected to any external compaction forces and remains bulky and loose. During the B-stage (i.e., low temperature ramp-and-hold period in FIG. 1), the resin softens and becomes molten at elevated temperatures. Reaction by-products are generated by the resin chemical reactions and chemo-viscosity builds up as well. In order to deplete the volatiles (i.e., reaction by-products and solvent), a vacuum is pulled to accelerate this process. However, because of the pressure differential, the vacuum causes the bag to collapse tightly onto the caul plate and compact the composite at the same time as shown in FIG. 2(b). Both the tightened fibrous architecture and increasingly viscous resin matrix inside the composite, because of vacuum suction and temperature increase during B-stage, create narrower passages for volatiles to escape. Sometimes in practice, prolonged B-stage time durations are employed to lower the residual volatile levels. However, this is not always successful due to resulting poor residual matrix fluidity rendering the composite to become unprocessable.

Polymeric prepreg material is commonly impregnated with a solution of resin to provide tack and drape for handleability. The SVB assembly and process are simply too primitive, too time consuming (i.e., costly) and ineffective in removing solvent and reaction by-product during composite fabrication.

SUMMARY OF THE INVENTION

Accordingly, it is an object of the present invention to provide an improved fabrication technique for producing reduced void content, more precise net shape controlled, fiber-reinforced polymer resin matrix composites with enhanced mechanical properties and performances.

It is another object of the present invention to provide an out-of-autoclave fabrication technique for use with reactive resin matrix, solvent containing prepreg, and/or polymer matrices having entrapped air.

Accordingly, the present invention provides a double-vacuum bag (DVB) fabrication technique for fabricating composites with polymer resin matrices, including those containing volatiles, reactive resin, and entrapped air. DVB fabrication processes eliminate compaction forces generated by vacuum suction while, in the meantime, maintaining vacuum effectiveness for the void management while forming composite structures. This has been proven and validated to be effective for void management, such as air or volatile management, in composites from reactive resin matrices such as polymides, and phenolics and solvent containing prepregs have been successfully prepared. This technique has been found to afford superior volatile management and net shape control during composite manufacturing. Many of the problems associated with oven single vacuum bag (SVB) processing are eliminated. Essentially void free composite laminates can be produced consistently with much enhanced mechanical properties over the SVB fabrication technique. In the presently preferred embodiment utilizing the DVB fabrication technique, a molding assembly is provided. The molding assembly of the preferred embodiment includes a tool plate with the resin matrix prepreg laid up intermediate to a caul plate and the tool plate. The first vacuum bag (inner bag) is sealed to the tool plate with a vacuum port built into the tool plate inside the inner bag connected to a vacuum pump to draw a vacuum within the inner bag. A second bag designated as an outer bag is similarly situated external to the inner bag with a perforated tool disposed intermediate to the outer bag and the inner bag. Furthermore, a second vacuum port provided intermediate to the outer bag and inner bag allows for the creation of a second vacuum atmosphere or environment.

In operation, a low temperature ramp and hold period is applied to the matrix composite by introducing a vacuum into the outer bag at a higher vacuum than the vacuum introduced in the inner bag. This pulls the inner bag towards the outer bag and does not compress the composite. Since the composite layer is not compacted by vacuum pressure, it remains loose and volatiles are free to escape by the vacuum suction from the inner bag vacuum pump during this stage. During single vacuum bag techniques, this would not be possible since the inner bag would be compacted around the composite.

At the end of the low temperature ramp-and-hold period (B-stage) the outer bag is purged to atmospheric pressure while the vacuum within the inner bag is increased. This causes the inner bag to collapse on the caul plate to consolidate the laminate during the high temperature ramp-and-hold period of the two-step cycle.

It is alternatively possible to apply a partial vacuum to the outer bag while pulling a higher, or full, vacuum to the inner bag which results in a relatively small compaction force on the composite while allowing a full vacuum to assist in volatile removal during the B-stage. The molding assembly can be placed in any heating chamber such as an oven, a vacuum oven, a vacuum press, or an autoclave to apply the necessary heat for the cure cycle stages.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 3:
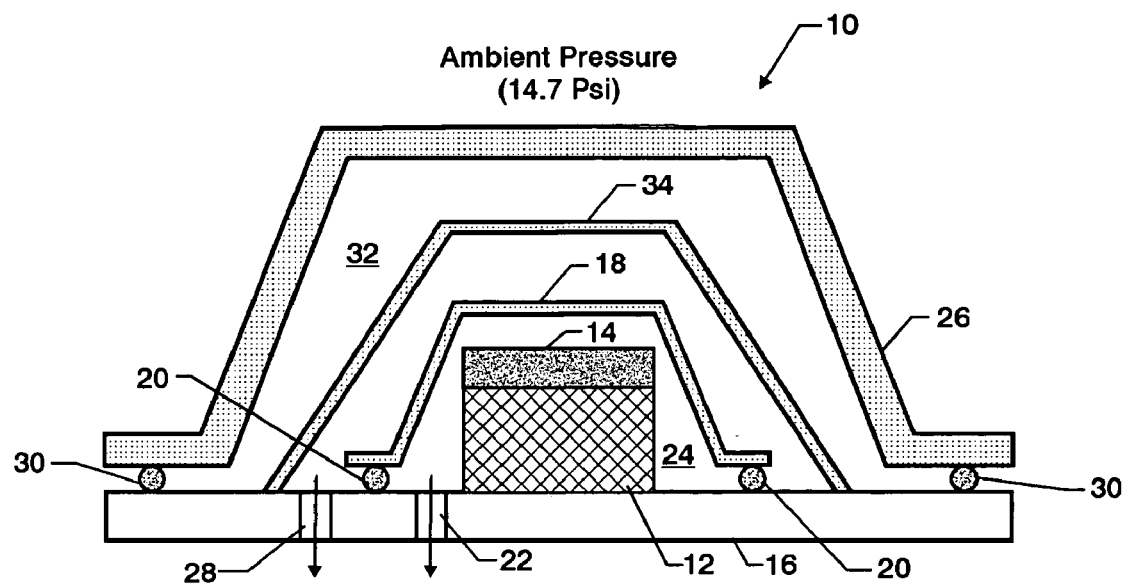
FIG. 3 is a schematic drawing of a presently preferred embodiment of double-vacuum-bag (DVB) molding assembly of the present invention.

The schematic drawing shown in FIG. 3 is of a double vacuum bag (DVB) molding assembly 10 for composite manufacturing. A composite 12 illustrated as fiber reinforced reactive resin matrix prepregs are laid up between a caul plate 14 and a tool plate 16. The caul and tool plates 14, 16 may be constructed of steel or other appropriate material.

A first barrier, such as a vacuum bag 18 (designated as inner bag), encloses the caul plate 14 and composite 12 relative to the tool plate 16 and is sealed by one or more seals 20 relative to the tool plate 16. A first vacuum port 22 is preferably built through the tool plate 16 or otherwise provided to communicate the interior 24 with a vacuum pump (not shown) to provide a first environment.

A second barrier, or bag 26 (designated as the outer bag) is preferably assembled in a somewhat similar fashion, with a second vacuum port 28 located intermediate to the seals 20 connecting the first bag 18 to the tool plate 16 and the seals 30 connecting the second bag 26 to the tool plate 16. This second vacuum port 28 is useful to draw a vacuum within the cavity 32 intermediate to the outer bag 26 and the inner bag 18 to provide a second environment. It is preferred that a second separate vacuum pump be connected to the second port 28. The second port 28 may be machined through the tool plate 16 somewhat similar to the first vacuum port 22 or otherwise provided to the cavity 32.

Before assembling the second bag 26 as shown in FIG. 3, it is preferable to install the perforated tool 34 outside the perimeter of the inner bag 18 in the second environment (i.e., in the cavity 32). The tool 34 has been designed in the preferred embodiment to be stiff enough to withstand the atmospheric pressure, i.e., 14.7 Psi pressure differential, as will be explained below.

For high temperature curing system such as 371° C. curing as is employed with the PETI-8 resin, a kapton™ film of 0.002" to 0.003" in thickness has been used as bagging material for the inner and outer bags 18,26. The inner and outer bags 18,26 can include other material or structures as are known in the art. Other barriers, apart from bags, may also be utilized to assist in creating the first and second environments.

Figure 1:
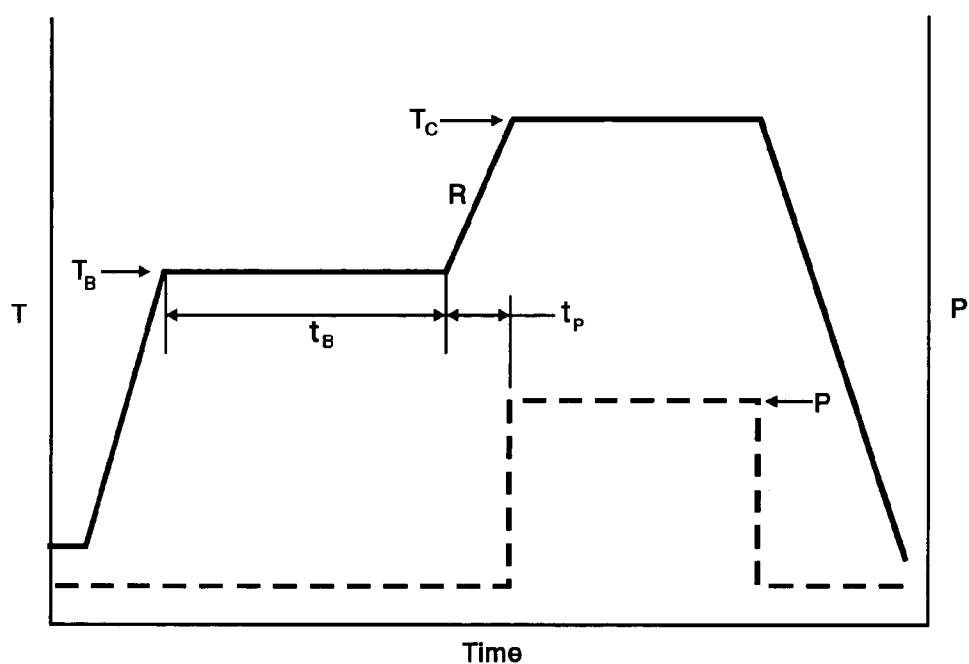
FIG. 1 is a prior art schematic drawing of a two-step cure cycle profile for cure cycle for manufacturing composite laminates with a reactive resin matrix.
Figure 2:
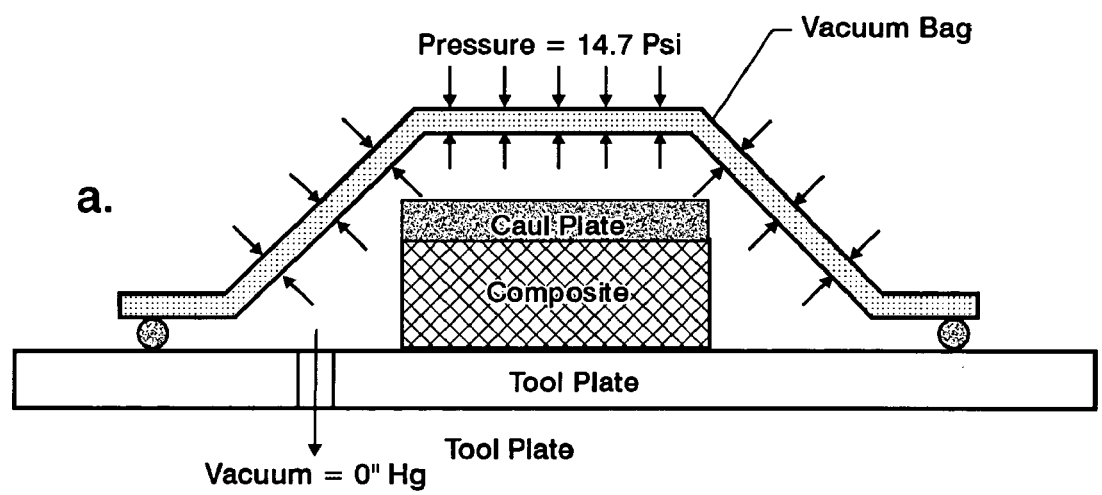
FIG. 2 is a prior art schematic of a drawing of a single vacuum bag (SVB) composite molding assembly.
Figure 2:
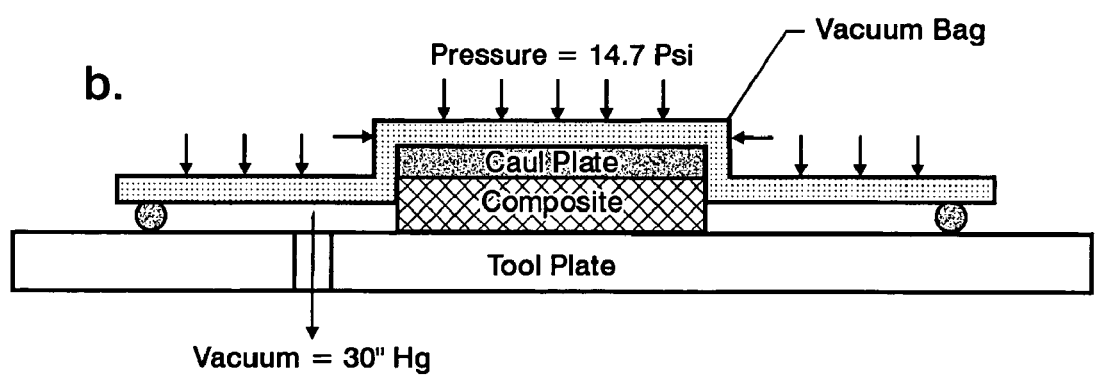

Once the assembly 10 is set up as shown in FIG. 3, the curing cycle of FIG. 1 may then be employed as discussed below as it relates to the application of vacuums and heat relative to the composite 12 during the curing cycle.

In accordance with preferred fabrication technique utilizing the molding assembly 10 shown in FIG. 3, a B-stage of the two-step cycle is first entered by reaching a first temperature through the ramp and hold step. This first temperature is usually a lower temperature than a final cure temperature. During this B-stage, a first vacuum amount such as a full vacuum (30 inches Hg.) is applied to the cavity 32 intermediate to the outer and inner bags 26,18. Within the interior 24 of the inner bag 18 a second vacuum amount is applied such as 28 inches of mercury. Accordingly, the difference in pressure is about 2 inches of mercury between the interior 24 and the cavity 32. Because of this vacuum differential, the inner bag balloons and presses against the interior of the tool 34 which leaves little or no compaction force to be applied to the composite 12 during the B-stage. Accordingly, the profile for the B-stage as shown in FIG. 1 is applied.

In this DVB arrangement, the composite layup assembly is, therefore, not compacted by vacuum pressure (i.e., 14.7 Psi) via the inner bag 34 and the composite 12 remains loose. This is believed to be advantageous as it relates to the control of resin flow, also referred to as net shape control. By not compressing excessive resin out of the matrix, the fabricator is believed to have more precise control of the percentage of resin remaining in the fabricated composite which may be important as it could affect the mechanical properties of the finished composite.

Volatiles and/or air are free to escape from the vacuum port 22 from the interior 24 during this B-stage. This is not possible in the prior art single vacuum bag (SVB) techniques.

At the end of the B-stage, the cavity 32 within the outer bag 26 can be purged to atmosphere, while the inner bag vacuum within the interior 24 can be increased to another vacuum amount such as about 30 inches Hg, or have the third amount of vacuum equal the second amount of vacuum. The outer bag 26 then becomes loose from the tool 34 and the inner bag 18 collapses onto the caul plate 14 with one atmospheric pressure (14.7 Psi) differential. This pressure helps to consolidate the laminate composite 12 during the high temperature ramp and hold period of the cure cycle as shown in FIG. 1. The outer bag 34 can, in principle, be purged to higher pressures above one atmosphere and still take consolidation of the composite 12 with poor matrix resin fluidity (i.e., high viscosity). Care must be taken in this situation with the outer bag 26, since the outer bag 26 will potentially balloon dramatically, thereby possibly leading to the rupture of the outer bag 26 and/or the bag seals 30 unless additional precaution and tool and assembly designs 10 are implemented.

The DVB fabrication process can be flexibly applied. For example, applying a partial vacuum (i.e., 25" Hg) to the cavity 32 within the outer bag 26, while pulling a higher vacuum (i.e., greater than 25" Hg or to up to 30" Hg) in the inner bag 18 (i.e., the interior 24), during the composite B-stage is also possible. In this case, the outer bag 26 collapses onto the tool 34 with a pressure (less than 1 atmospheric pressure as created by the 25" Hg vacuum). Because of the vacuum differential between the two bags, the inner bag is collapsed, instead of "ballooned" and pressure against the composite wall with a small compaction pressure (created by the vacuum differential of 5" Hg between the two bags 26,18), while still producing a 30" Hg full vacuum to assist volatile removal. Under these type circumstances, the volatile depletion rates may not be hindered by the slightly compacted fibrous architecture, while the potential for inner bag 18 leakage is greatly reduced.

Figure 4:
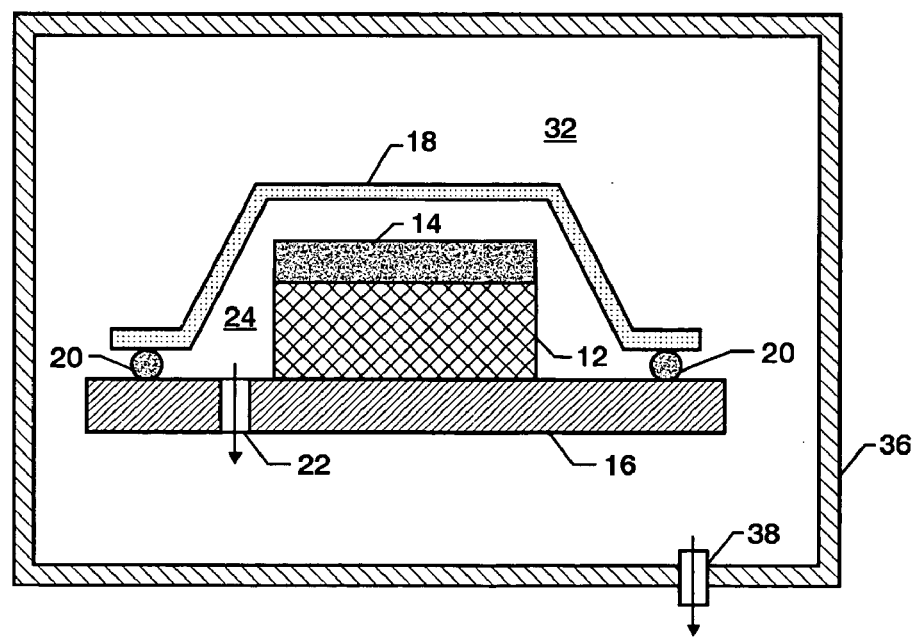
FIG. 4 is a schematic drawing of an alternatively preferred embodiment of the present invention.

The concepts of DVB assembly and processing described above can be easily implemented in any heating chamber 36 such as an oven, a vacuum oven, a press, a vacuum press or an autoclave embodiment shown in the alternatively preferred embodiment illustrated in FIG. 4. In some vacuum press embodiments, a user may simply assemble the inner bag 18 relative to the caul plate 14 and composite 12 and the tool plate 16. The chamber 36 can serve as the outer bag providing the first environment and the stiff perforated tool between the chamber 36 and inner bag 18 may not be needed in this embodiment. In an autoclave embodiment, a user may assemble the inner bag 18 relative to the caul plate 14 and composite 12 and the tool plate 16 and the perforated tool, if utilized, between the chamber 36 and inner bag 18. Here the chamber 36 serves as the outer bag in this embodiment. A third vacuum port 38 may be useful in this embodiment. For molding composites with poor matrix resin fluidity (i.e., high viscosity) at elevated temperatures, extra pressure can also be applied safely to facilitate composite consolidation after B-stage through platens (in a vacuum press) or pressurized gases (in an autoclave).

With proper tooling designs, the DVB concept for volatile management can be adapted to other composite manufacturing process such as vacuum assisted resin transfer molding (VARTM), solvent assisted resin transfer molding (SARTM) and/or resin film infusion (RFI) processes, in which the proper removal of volatiles is an issue.

As it relates to PETI-8 which is a phenylethynyl terminated imide composite matrix material, the phenylethynyl groups of the ends of the linear polyimide react with each other upon heating to temperatures greater than ~300° C. (~575° F.). This resin exhibits a low viscosity, which is stable over a long period of time at temperatures between 200° to 275° C. rendering itself seemingly suitable for composite fabrication by an oven, vacuum bag processing technique. While this reaction produces no volatiles, the ring closure of the amide acid to imide, which occurs at temperatures greater that ~200° C. (~400° F.), produces water as a by-product. Furthermore, the LARC™ PETI-8 prepreg contains volatile NMP solvent (~14% by weight) that is left during the prepregging process for handleability (prepreg tack and drape). For the composite process to be successful in producing a quality, void free part, it must adequately manage the water from imidization and the residual solvent left over from the prepregging process.

An identical temperature profile was used for composites molded by either the SVB or DVB process: an initial 250° C./1 hr B-stage ramp-and-hold from room temperature (RT) at 3° C./min, followed by a second ramp-and-hold at the same rate to 371° C./1 hr final curing. The laminate lay-up scheme is 3"×3"–$[0]_8$. Vacuum pressure (i.e., 14.7 Psi created by the 30" Hg vacuum) was applied throughout the cure cycle for the SVB process. In the DVB process, full vacuum (30" Hg) is applied to the outer bag, while a slightly lower vacuum level (i.e., 28" Hg) is set in the inner bag during the B-stage period. At the end of the 250° C./1 hr B-stage, the outer bag 26 was purged to atmosphere and the inner bag vacuum was increased to 30" Hg. The atmospheric pressure created by the inner bag vacuum helped to consolidate the volatile-free composite during the 371° C./1 hr ramp-and-hold period.

Figure 5:
FIG. 5 is a comparison or optical photomicrographs of SVB molded laminate and DVB molded laminate showing the difference in the structures when using phenylethynyl terminated imide-8 (an aromatic polyimide based on 3,3', 4,4'-biphenyltetracarboxilic dianhydride, a 50:50 molar ratio of 3,4'-oxydianiline and 1,3-bis(3-aminophenoxy)benzene, with 4-phenylethynylphthalic anhydride as the endcapping agent at a theoretical number average molecular weight of 2,500 grams per mole.) (hereinafter "PETI-8")
Figure 5:
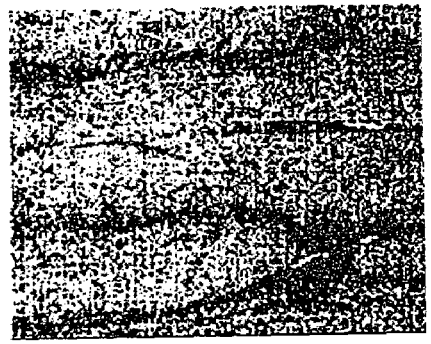

The cross section photomicrographs of the resultant laminates are shown in FIG. 5. Excessive resin squeeze-out and high void content were observed for the SVB molded laminate. The domains between plies that are typically resin-rich, are particularly high in void content when compared to those domains within the fiber bundles (FIG. 5(a)). The oven SVB processing is ineffective and creates problems not only in maintaining the targeted resin content, but also in avoiding volatile entrapments in the final consolidated laminate parts. A photomicrograph of the resultant laminate fro the DVB process in FIG. 5(b) shows a superior void-free laminate than that fabricated by the SVB process. Much less resin flash was observed in laminates molded by the DVB process.

When the prepreg was laid-up at room temperature ("RT"), the composite was filled with air, especially between the prepreg plies. In the SVB process, as vacuum was pulled at RT, and while the temperature was ramped to the B-stage condition, atmospheric pressure created by the vacuum compacted the composite because of the softening of matrix resin. The compacted fibrous architecture retarded the volatile depletion rates and a significant amount of "air-filled pockets" surrounded by the molten resin were formed. These pockets were concentrated between prepreg plies. Similarly additional "volatile-filled pockets" were formed inside the fiber bundles that were matrix resin impregnated. The formation of these two types of pockets in the SVB process led to the voided network pattern observed in FIG. 5(a). On the other hand, in the DVB process, there was no atmospheric pressure created by the inner bag vacuum, and the composite (even though under vacuum) was not compacted during the B-stage allowing passageways for the air and volatiles to escape. "Vacuum pockets" surrounded by the molten resin matrix were formed in this case both inside the fiber bundles and between the prepreg plies. These "vacuum pockets" were then easily filled by the flow of low viscosity resin at elevated temperatures when atmospheric pressure was applied, resulting to a void-free consolidation as seen in FIG. 5(b).

The enhanced capability of volatile management offered by the DVB process is due to the following two attributes: 1) vacuum suction in the inner bag 18 lowers the vapor pressure (and the boiling point) of the volatiles, resulting in an acceleration of the depletion rates at lower temperatures (which helps to maintain processability of the resin matrix after B-stage); and 2) the absence of compaction force during volatiles depletion period (i.e., the B-stage) relieves physical constraints of the volatiles passageways resulting in a further enhancement of volatiles depletion rates.

Figure 6:
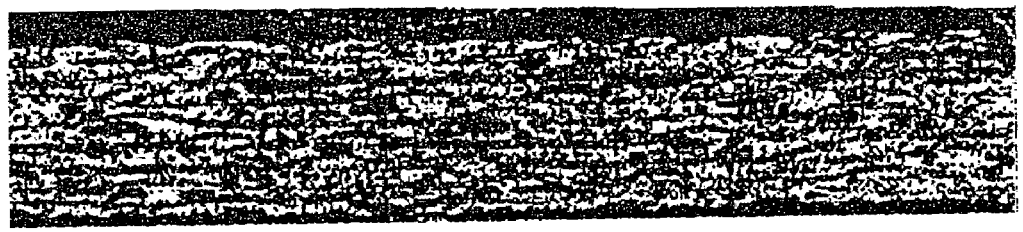
FIG. 6 are optical photomicrographs of SVB and DVB molded E-glass Cycom™ 6070 phenolic composites.
Figure 6:
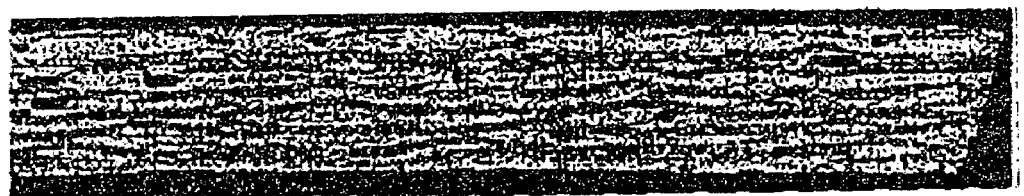

Short beam shear (SBS) strength and 0° flexural (0° Flex) strength and modulus were measured for both SBV-molded and DVB-molded laminates. The test matrix and specimen lay-up and dimensions are shown in Table 1. Mechanical properties at RT and 350° F. were measured. Results are summarized in Table 2 and plotted in FIG. 6. Also included in Table 2 are properties of the IM7/LARC™ PETI-5 composite, a similar high performance material, prepared in a press under 200 Psi pressure for comparison.

TABLE 1

IM7/LARC(™)PETI-8 polyimide composite mechanical test matrix.

| | | Specimen | | | |
|---|---|---|---|---|---|
| Mechanical test | Lay-up | Length (cm) | Width (cm) | Temp. (° F.) | No. tested at each temp. |
| SBS | $[0]_{16}$ | 1.905 | 0.635 | RT, 350 | 4–7 |
| 0° flex* | $[0]_8$ | 6.985 | 1.27 | RT, 350 | 4–8 |

*0° in fiber direction of the uni-directional composite

TABLE 2

IM7/LARC(™) PETI-8 polyimide composite mechanical properties.[a]

| Mechanical property | Test temp. (° C.) | IM7/LARC(™) PETI-8 molded by DVB | IM7/LARC(™) PETI-8 molded by SVB | IM7/LARC(™) PETI-5 molded by press |
|---|---|---|---|---|
| SBS strength | RT | 17.7 ± 0.7 | 14.7 ± 0.8 | 17.8 ± 0.6 |
| (Ksi) | 177 | 5.4 ± 0.1 | — | 5.1 ± 0.3 |
| Flex strength | RT | 236.0 ± 18.3 | 204.2 ± 11.0 | 219.2 ± 6.6 |
| (Ksi) | 177 | 150.8 ± 6.2 | 144.9 ± 12.4 | 135.7 ± 3.1 |
| modulus | RT | 19.8 ± 3.2 | 18.9 ± 06 | 17.9 ± 0.8 |
| (Msi) | 177 | 21.6 ± 1.2 | 19.0 ± 0.2 | 17.7 ± 0.3 |

[a] Both PETI-8 and PETI-5 composites were cured at 371° C. (700° F.)/1 hr. PETI-8 laminate was consolidated by vacuum pressure (i.e., 14.7 Psi) alone, while PETI-5 laminate was consolidated under 200 Psi by press.

For the RT SBS strength, 20% higher values were measured or the DVB-molded specimens when compared to the SVB-molded specimens. The DVB-molded PETI-8 laminate also exhibited a SBS strength level which is comparable to that measured for the PETI-5 laminate, despite the differences in molecular weight (i.e., 2,500 g/mole for the PETI-8 versus 5,000 g/mole for the PETI-5) and consolidation pressure employed (i.e., 14.7 Psi for the PETI-8 composite versus 200 Psi for the PETI-5 composite).

For the RT 0° Flex strength values, the DVB-molded specimens again exhibited a 15% higher values than that of SVB-molded specimens. Flex strengths of the DVB-molded and the PETI-5 laminates were comparable when taking into account the standard deviations of the measurements. For the 0° Flex modulus, comparable values were obtained between the SVB-molded and the DVB-molded specimens at both temperatures. There is no difference of statistical significant in the modulus values between the PETI-8 and the PETI-5 composites.

These results demonstrate that DVB-molded laminates possess significantly improved (i.e., >15% higher) SBS and 0° flexural properties over the traditional SVB-molded laminates. Mechanical properties of the DVB-molded PETI-8 composite are comparable to those exhibited by the PETI-5 composite, which possesses a higher molecular weight.

While PETI-8 was studied in detail, a second composite system was also investigated in some detail. The second system, commercial 7781 E-glass/Cycom 6070 prepreg (8 harness satin fabric), was received from Cytec Engineering Materials (Anaheim, Calif.). This prepreg contains 3-5% volatiles. Cycom® 6070 is a 138° C. to 160° C. (280° F. to 320° F.) curing phenolic resin. It has a service temperature up to 260° C. (500° F.) when stepwise post-cured up to 232° C. (450° F.). Cycom® 6070 is a novolac and releases water as a reaction by-product when curing. For both materials, volatiles (water and solvent) management is a critical issue to yield high quality, void-free laminates during composite fabrication.

An identical temperature profile was used for this composite molded by either the SVB or DVB process: a single ramp from RT to 138° C. (280° F.) at ~3° C./min (5° F./min) with a 1 hr hold, followed by a cool down to RT. The laminate lay-up scheme is eight layers 6:×6:–8 harness satin fabric. Atmospheric pressure created by the vacuum was applied throughout the cure cycle for the SVB process. In the DVB process, a full vacuum (30" Hg) is applied to the outer bag, while a slightly lower vacuum level (i.e., 28" Hg) is set in the inner bag during the temperature ramp from RT. When the temperature reached 105° C. (220° F.), the outer bag was purged to atmosphere and the inner bag vacuum was increased to 30" Hg. The atmospheric pressure created by the inner bag vacuum helped to consolidate the composite during the remaining ramp-and-hold period.

The cross section photomicrographs of the resultant laminates are shown in FIG. 7. High void contents were observed for the SVB molded laminate (FIG. 7(a)). The resin-rich domains between fiber tows are particularly high in void content when compared to those domains within the tows. The oven SVB process is again ineffective and creates problems in avoiding volatile entrapments in the final consolidated laminate parts. Photomicrograph of the resultant laminate fabricated by the DVB process in FIG. 7(b) shows a greatly improved quality part. These results are preliminary so optimized processing conditions are expected to improve part quality further.

TABLE 3

7781 E-glass/Cycom 6070 phenolic composite mechanical test matrix.

| Mechanical test | lay-up | Length (cm) | Width (cm) | Specimen Temp. (° F.) | No. tested At each temp. |
|---|---|---|---|---|---|
| SBS | 16 layers | 1.905 | 0.635 | RT, 180 | 4-7 |
| 0° flex* | 8 layers | 6.985 | 1.27 | RT, 180 | 4-8 |

*0° in warp direction

TABLE 4

7781 E-glass/Cycom 6070 phenolic composite mechanical properties.

| Mechanical property | Test temp. (° F.) | 7781 E-glass/ Cycom 6070 (reported by the supplier*) | 7781 E-glass Cycom 6070 (fabricated by SVB) | 7781 E-glass/ Cycom 6070 (fabricated by DVB) |
|---|---|---|---|---|
| SBS strength | RT | 2.1–2.2 | 4.5 ± 0.1 | 6.5 ± 0.2 |
|  | 180 | 1.6–1.8 | 4.1 ± 0.1 | 6.1 ± 0.2 |
| Flex strength (Ksi) | RT | 67–74 | 65.2 ± 3.0 | 88.3 ± 1.4 |
|  | 180 | 61–68 | 57.5 ± 2.5 | 75.4 ± 2.0 |
| modulus (Msi) | RT | 3.5–3.8 | 5.1 ± 0.2 | 4.9 ± 0.1 |
|  | 180 | 3.5–3.9 | 4.5 ± 0.1 | 4.5 ± 0.2 |

*Cycom 6070 Phenolic Resin Technical Datasheet, Jan. 29, 2002, Cytec Engineered Materials, Anaheim, CA Short beam shear (SBS) strength and 0° flexural (0° Flex) strength and modulus were measured for both SVB-molded and DVB-molded laminates. The test matrix is shown in Table 3. Mechanical properties at RT and 180° F. were measured. Results are summarized in Table 4 and plotted in FIG. 8. Published strength and modulus values from the material supplier for this composite are also included in the table for comparison.

For the SBS strength, both SVB-molded and DVB-molded laminates exhibited significantly higher values than those reported by the supplier. In addition, the SBS strengths of the DVB-molded specimens were 44% and 48% higher at RT and 180° F., respectively, when compared to the strengths of the SVB-molded counterpart.

For the 0° Flex modulus, comparable values were obtained for the supplier-reported and the SVB-molded specimens at both temperatures. When comparing to the DVB-molded specimens, the strength values were 35% and 31% higher at RT and 180° F., respectively. For the 0° Flex modulus, comparable values were obtained between the SVB-molded and the DVB-molded specimens at both temperatures. The reported modulus values from supplier were, however, about 20% lower.

These results demonstrate that DVB-molded laminates possess significantly improved (i.e., >30% higher) SBS and 0° flexural properties over the traditional SVB-molded laminates. These mechanical properties also surpass those reported by the material supplier by a significant margin.

Composite fabrication of structural composites is usually costly and time consuming. Large, commercial autoclaves cost tens of millions of dollars and are very expensive to operate and maintain. Processing methods that eliminate the costs and size limitations of these autoclaves are extremely attractive from both a cost and production rate viewpoint. Many high performance resin/fiber composites are thermosets, meaning that material cycling/recovery is not possible once cured. Investment in both material and equipment for the fabrication of each part is very substantial.

Volatile management is often a common and critical issue in the manufacturing of high performance/temperature resistant resin matrix composites. Many classes of industrially important engineering resin systems, such as polyimides and phenoloics, generate reaction by-product (i.e., water) during curing. These by-products, together with the carrier solvents, require effective management in order to yield quality laminate parts. A workable, robust, effective and low cost technique such as DVB for the management of volatiles is therefore desirable and crucial to ensure an end product with the intended quality of design.

The subject DVB process for volatile management can easily be adapted to a variety of composite manufacturing processes. For resin matrices with low to moderate viscosities (i.e., <250 Poises), a vacuum-only DVB process in an oven is sufficient for void-free composite part consolidation. For resin matrices with viscosities higher than 250 Poises, an autoclave or a press incorporated with the DVB process will afford additional pressure (i.e., greater than 14.7 Psi) for composite part consolidation.

The composite industry will be very interested in this innovation. The DVB process is not only adaptable for manufacturing equipment such as ovens, autoclaves and presses, but also applicable to other important composite fabrication processes such as resin film infusion (RFI) and vacuum-assisted resin transfer (VARTM) molding processes.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

The invention claimed is:

1. A fabrication method for polymer matrix composites comprising the steps of:
providing a heating chamber about a molding assembly comprising a tool plate spaced from a caul plate by a composite with an inner barrier at least partially about the caul plate and at least assisting in providing a first environment about the composite, a second enviromnent external to the composite and the inner barrier;
drawing a vacuum of a first amount in the first environment;
drawing a vacuum of a second amount in the second environment, said first amount not equal to the second amount;
performing at least one stage of a curing process in the heating chamber by providing a first predetermined temperature for a first predetermined time period while providing the vacuums in the first and second environments of the first and second amounts, the at least one stage being a B-stage of a two-step cure cycle, the first predetermined time being a B-stage time, and the first predetermined temperature being a B-stage temperature;
completing the B-stage and providing a second predetermined temperature in the heating chamber for a second predetermined time; and
providing a vacuum of a third amount within the first environment while releasing the vacuum in the second environment.

2. The fabrication method of claim 1 wherein the second predetermined temperature is the final cure temperature in the two step cure cycle.

3. The fabrication method of claim 2 wherein when providing the first and second amounts of vacuum, the second amount is greater than the first amount, and further comprising a tool having at least one perforation within the second environment external to the inner barrier.

4. The fabrication method of claim 1 further comprising a first vacuum port in communication with the first environment, and a second vacuum port in communication with the second environment, and at least one vacuum pump connectable to at least one of the first and second vacuum ports which provides the vacuums of the first and second amounts;
wherein at least one of the first and second vacuum ports pass through the tool plate, and the first amount of vacume is drawn through the first port with the inner barrier sealed to the tool plate to provide the first environment in an interior defined by the inner barrier and tool plate;
wherein the inner barrier is an inner bag;
further comprising an outer bag sealed to the tool plate externally to the inner bag with the second port communicating to the second environment within a cavity defined intermediate the outer bag and the inner bag; and
a perforated steel tool intermediate the inner and outer bags, and upon providing the first and second amounts of vacuum, at least one of the inner and outer bags contacting the perforated steel tool.

5. The fabrication method of claim 4 wherein the heating chamber forms the second environment and is provided with a third port connectable to a vacuum pump.

6. The fabrication method of claim 5 wherein a polymer matrix composite is selected from the group consisting of reactive matrix composites producing volatiles during curing, non-reactive composites having solvent containing prepegs, and reactive composites having solvent containing prepegs.

7. A fabrication method for polymer matrix composites comprising the steps of:
providing a heating chamber about a molding assembly having a tool plate spaced from a caul plate by a composite to be cured, said molding assembly having an inner barrier about the caul plate sealed against the tool plate at least assisting in forming a first environment there between, and a second environment external to the composite to be cured and the inner barrier, said second environment capable of being subjected to a vacuum:
drawing a vacuum of a first amount in the first environment;
drawing a vacuum of a second amount in the second environment, said first amount not equal to the second amount;
heating the composite to be cured from room temperature to a first predetermined B-stage temperature of a two-stage cure cycle for a first predetermined time period to perform at least one stage of a curing process in the heating chamber, while providing the vacuums in the first and second environments of the first and second amounts;
elevating the temperature from the first predetermined temperature to a second predetermined temperature;
applying at least one of a pressure and a vacuum to the composite at the second predetermined temperature in the first environment; and
applying a vacuum of a third amount in the first environment while maintaining the composite at the second predetermined temperature for a second predetermined time.

8. The fabrication method of claim 7 wherein the second predetermined time is the final cure time and the second predetermined temperature is the final cure temperature of a two-step cure cycle.

9. The fabrication method of claim 8 further comprising providing a perforated tool in the second environment when applying the vacuums to the first and second environment of the first and second amounts, the second amount being greater than the first amount and the inner bag contacting the perforated tool.

10. The fabrication method of claim 9 wherein during the applying the third amount of vacuum in the first environment, the inner bag does not contact the perforated tool.

11. The fabrication method of claim 10 wherein at least one of the first, second, and third amounts of vacuum is at least 30 inches of mercury and at least one of the first, second and third amounts of vacuum is less than 30 inches of mercury.

12. The fabrication method of claim 11 wherein the polymer matrix composite is selected from the group consisting of reactive matrix composites producing volatiles during curing, non-reactive composites having solvent containing prepegs, and reactive composites having solvent containing prepegs.

* * * * *